US009661579B1

(12) United States Patent
Zhang

(10) Patent No.: US 9,661,579 B1
(45) Date of Patent: May 23, 2017

(54) PER-TONE POWER CONTROL IN OFDM

(71) Applicant: MARVELL INTERNATIONAL LTD., Hamilton (BM)

(72) Inventor: Hongyuan Zhang, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 227 days.

(21) Appl. No.: 14/268,921

(22) Filed: May 2, 2014

Related U.S. Application Data

(60) Provisional application No. 61/819,234, filed on May 3, 2013.

(51) Int. Cl.
*H04W 52/04* (2009.01)
*H04L 27/26* (2006.01)
(Continued)

(52) U.S. Cl.
CPC ......... *H04W 52/04* (2013.01); *H04L 27/2601* (2013.01); *H04L 5/0007* (2013.01); *H04W 72/042* (2013.01); *H04W 72/0453* (2013.01)

(58) Field of Classification Search
CPC ... H04W 52/38; H04W 52/325; H04W 52/04; H04B 7/0615; H04B 7/0842; H04B 7/0408; H03G 3/3042; H01Q 3/40
(Continued)

(56) References Cited

U.S. PATENT DOCUMENTS 4,685,099 A * 8/1987 White .................. H04B 1/50
370/278

6,690,652 B1 * 2/2004 Sadri .................. H04L 1/0003
370/252
(Continued)

FOREIGN PATENT DOCUMENTS

WO  WO-2007/103085 A2  9/2007

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, *The Institute of Electrical and Electronics Engineers, Inc.*, pp. 1-2695 (Mar. 29, 2012).
(Continued)

*Primary Examiner* — Andrew Lai
*Assistant Examiner* — Andrew C Lee

(57) ABSTRACT

A first communication device calculates channel state information (CSI), and based on the CSI, (i) determines a first signal attenuation level corresponding to signals transmitted over a first sub-carrier frequency signal, and (ii) determines a second signal attenuation level corresponding to signals transmitted over a second sub-carrier frequency signal. The first communication device transmits data encoded over the first sub-carrier frequency and the second and second sub-carrier frequency to a second communication device by (i) increasing power loaded to signals transmitted over a sub-carrier frequency from among the first sub-carrier frequency and the second sub-carrier frequency that is associated with greater signal attenuation, and (ii) decreasing power loaded to signals transmitted over a sub-carrier frequency from among the first sub-carrier frequency and the second sub-carrier frequency that is associated with lesser signal attenuation.

9 Claims, 5 Drawing Sheets

(51) Int. Cl.
*H04W 72/04* (2009.01)
*H04L 5/00* (2006.01)

(58) Field of Classification Search
USPC .............................. 370/338, 329; 455/522
See application file for complete search history.

(56) References Cited

U.S. PATENT DOCUMENTS

| | | | |
|---|---|---|---|
| 7,042,957 B1* | 5/2006 | Zirwas | H04L 5/0048 375/260 |
| 7,194,042 B2 | 3/2007 | Walton et al. | |
| 7,412,242 B2* | 8/2008 | Cho | H04L 5/0044 455/447 |
| 7,729,439 B2 | 6/2010 | Zhang et al. | |
| 7,912,476 B2* | 3/2011 | Kwon | H04J 13/00 455/452.2 |
| 8,155,138 B2 | 4/2012 | van Nee | |
| 8,340,597 B1 | 12/2012 | Nabar et al. | |
| 8,526,351 B2 | 9/2013 | Fischer et al. | |
| 8,644,368 B1 | 2/2014 | Zhang et al. | |
| 8,654,794 B2* | 2/2014 | Shimomura | H04L 5/0007 370/491 |
| 8,724,720 B2 | 5/2014 | Srinivasa et al. | |
| 2003/0072379 A1* | 4/2003 | Ketchum | H04B 7/0417 375/260 |
| 2004/0151146 A1* | 8/2004 | Hammerschmidt | H04B 7/0615 370/338 |
| 2004/0151264 A1* | 8/2004 | Montojo | H03G 3/3036 375/345 |
| 2004/0198235 A1* | 10/2004 | Sano | H04B 7/00 455/69 |
| 2005/0048932 A1* | 3/2005 | Balasubramaniyan | H04B 1/406 455/93 |
| 2005/0052991 A1 | 3/2005 | Kadous | |
| 2005/0078762 A1 | 4/2005 | Ketchum et al. | |
| 2005/0185728 A1 | 8/2005 | Wallace et al. | |
| 2005/0185733 A1* | 8/2005 | Tolli | H04L 1/0025 375/285 |
| 2006/0093067 A1 | 5/2006 | Jalali et al. | |
| 2006/0126752 A1 | 6/2006 | Hansen et al. | |
| 2006/0153309 A1* | 7/2006 | Tang | H04L 27/2608 375/260 |
| 2007/0041457 A1 | 2/2007 | Kadous et al. | |
| 2007/0157279 A1* | 7/2007 | Hara | H04L 27/2601 725/124 |
| 2007/0201344 A1* | 8/2007 | Miyabayashi | H04L 27/2608 370/203 |
| 2007/0230373 A1 | 10/2007 | Li et al. | |
| 2007/0230548 A1* | 10/2007 | Van de Wiel | H04B 3/32 375/219 |
| 2008/0014870 A1 | 1/2008 | Kim | |
| 2008/0089396 A1* | 4/2008 | Zhang | H04B 7/0617 375/220 |
| 2008/0132173 A1* | 6/2008 | Sung | H04L 1/0019 455/67.13 |
| 2008/0214120 A1* | 9/2008 | Nakaya | H04L 5/006 455/67.13 |
| 2008/0219373 A1 | 9/2008 | Zhang et al. | |
| 2008/0266176 A1* | 10/2008 | Nabar | H03G 3/3042 342/373 |
| 2008/0279257 A1* | 11/2008 | Vujcic | H04B 7/2637 375/132 |
| 2009/0052642 A1* | 2/2009 | Tackin | H04M 7/006 379/93.05 |
| 2009/0067520 A1* | 3/2009 | Gallizio | H04L 25/0224 375/260 |
| 2009/0097395 A1 | 4/2009 | Zhang et al. | |
| 2009/0104908 A1* | 4/2009 | Matsumoto | H04L 5/0046 455/436 |
| 2009/0196163 A1 | 8/2009 | Du | |
| 2009/0221241 A1 | 9/2009 | Ghosh | |
| 2009/0325626 A1* | 12/2009 | Palanki | H04L 5/0007 455/522 |
| 2010/0007355 A1* | 1/2010 | Olgaard | H04B 17/327 324/601 |
| 2010/0091673 A1 | 4/2010 | Sawai et al. | |
| 2010/0104038 A1 | 4/2010 | Stager et al. | |
| 2010/0172425 A1 | 7/2010 | Pare, Jr. et al. | |
| 2010/0173637 A1* | 7/2010 | Damnjanovic | H04L 5/0007 455/447 |
| 2010/0248665 A1* | 9/2010 | Jonsson | H03G 3/3068 455/140 |
| 2010/0266055 A1* | 10/2010 | Mueck | H04B 7/022 375/260 |
| 2011/0002219 A1 | 1/2011 | Kim et al. | |
| 2011/0019768 A1 | 1/2011 | Nammi et al. | |
| 2011/0086603 A1* | 4/2011 | Toosi | H04B 1/1027 455/192.1 |
| 2011/0218007 A1* | 9/2011 | Kimura | H04W 72/082 455/512 |
| 2011/0235728 A1* | 9/2011 | Karabinis | H04L 5/0007 375/260 |
| 2011/0268232 A1* | 11/2011 | Park | H04B 1/30 375/344 |
| 2011/0294448 A1* | 12/2011 | Vauhkonen | H03G 3/3068 455/232.1 |
| 2012/0026908 A1* | 2/2012 | Tzannes | H04L 41/12 370/252 |
| 2012/0177226 A1* | 7/2012 | Silverstein | G06F 1/3212 381/107 |
| 2012/0231833 A1* | 9/2012 | Kolding | H04W 52/243 455/522 |
| 2013/0176874 A1* | 7/2013 | Xu | H04W 52/242 370/252 |
| 2013/0315320 A1* | 11/2013 | McGowan | H04L 27/2655 375/260 |
| 2014/0094204 A1* | 4/2014 | Dimou | H04W 52/242 455/501 |
| 2014/0113677 A1* | 4/2014 | Parkvall | H04W 52/146 455/522 |
| 2014/0213315 A1* | 7/2014 | Kim | H04W 52/38 455/522 |
| 2015/0011233 A1* | 1/2015 | Kazmi | H04W 16/14 455/454 |
| 2015/0018030 A1* | 1/2015 | Park | H04W 52/283 455/522 |

OTHER PUBLICATIONS

IEEE Std 802.11ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft STANDARD for Information Technology—Telecommunications and information exchange between systems—Local and metropolitan area networks—Specific require-

(56) References Cited

OTHER PUBLICATIONS ments, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, Jan. 2013.

IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std 802.16a-2003 (Amendment to IEEE Std 802.16-2001) "IEEE Standard for Local and metropolitan area networks: Part 16: Air Interface for Fixed Broadband Wireless Access Systems—Amendment 2: Medium Access Control Modifications and Additional Physical Layer Specifications for 2-11 GHz," *The Institute of Electrical and Electronics Engineers, Inc.*, pp. 1-292 (Apr. 1, 2003).

IEEE Std 802.16e-2005 and IEEE Std 802.16/2004/Cor1-2005 (Amendment and Corrigendum to IEEE Std 802.16-2004), IEEE Standard for Local and metropolitan area networks: Part 16: Air Interface for Fixed and Mobile Broadband Wireless Access Systems: Amendment 2: Physical and Medium Access Control Layers for Combined Fixed and Mobile Operation in Licensed Bands and Corrigendum 1, *The Institute of Electrical and Electronics Engineers, Inc.*, pp. 1-864 (Feb. 28, 2006).

Gunnam et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Love et al., "An Overview of Limited Feedback in Wireless Communication Systems," IEEE J. On Selected Areas in Communications, vo. 26, No. 8, pp. 1341-1365 (Oct. 2008).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

van Nee et al. "The 802.11n MIMO-OFDM Standard for Wireless LAN and Beyond," Wireless Personal Communications, vol. 37, pp. 445-453 (Jun. 2006).

Zhang et al., "Applying Antenna Selection in WLANs for Achieving Broadband Multimedia Communications," *IEEE Trans. on Broadcasting*, vol. 52, No. 4, pp. 475-482 (Dec. 2006).

International Search Report and Written Opinion in International Application No. PCT/US2007/078780, dated Mar. 10, 2008 (12 pages).

International Preliminary Report on Patentability in International Application No. PCT/US2007/078780, issued Mar. 24, 2009 (6 pages).

\* cited by examiner

PER-TONE POWER CONTROL IN OFDM

CROSS-REFERENCE TO RELATED APPLICATION

This application claims the benefit of U.S. Provisional Patent Application No. 61/819,234, entitled "Per-Tone Power Control in OFDM," which was filed on May 3, 2013, the entire disclosure of which is hereby incorporated by reference herein.

FIELD OF TECHNOLOGY

The present invention relates generally to wireless communication systems and, more particularly, to controlling sub-carrier signal power distribution in wireless communication systems.

BACKGROUND

An ever-increasing number of relatively cheap, low power wireless data communication services, networks and devices have been made available over the past number of years. Various wireless technologies are described in detail in the 802.11 IEEE Standard, including for example, the IEEE Standard 802.11 (1999) and its updates and amendments, the IEEE Standard 802.11a/g (2003), as well as the IEEE Standard 802.11n and the IEEE Standard 802.11ac, all of which are collectively incorporated herein fully by reference. These standards have been or are in the process of being commercialized with the promise of 54 Mbps or more effective bandwidth, making them a strong competitor to traditional wired Ethernet and the more ubiquitous "802.11b" or "WiFi" 11 Mbps mobile wireless transmission standard.

Generally speaking, transmission systems compliant with the IEEE 802.11a and 802.11g or "802.11a/g" as well as the 802.11n and 802.11ac standards achieve their high data transmission rates using Orthogonal Frequency Division Multiplexing (OFDM) to encode symbols mapped to a quadrature amplitude modulation (QAM) multi-carrier constellation. In a general sense, the use of OFDM divides the overall system bandwidth into a number of frequency sub-bands or channels, with each frequency sub-band being associated with one or more respective sub-carriers upon which data may be modulated. Thus, each frequency sub-band of the OFDM system may be viewed as an independent transmission channel within which to send data, thereby increasing the overall throughput or transmission rate of the communication system.

To further increase the number of signals which may be propagated in the communication system and/or to compensate for deleterious effects associated with the various propagation paths, and to thereby improve transmission performance, it is known to use multiple transmission and receive antennas within a wireless transmission system. Such a system is commonly referred to as a multiple-input, multiple-output (MIMO) wireless transmission system and is specifically provided for within the 802.11n IEEE Standard. As is known, the use of MIMO technology produces significant increases in spectral efficiency and link reliability, and these benefits generally increase with the number of transmission and receive antennas within the MIMO system.

In wireless communication systems, the modulated signals generated by the transmitter may reach a particular receiver via a number of different propagation paths, the characteristics of which typically change over time due to the phenomena of multi-path and fading. Moreover, the characteristics of a propagation channel differ or vary based on the frequency of propagation. To compensate for the time varying, frequency selective nature of the propagation effects, and to enhance effective encoding and modulation in a wireless communication system, each transmitter and/or receiver of the wireless communication system may periodically develop or collect channel state information (CSI) for each of the frequency channels, such as the channels associated with each of the OFDM sub-bands discussed above. Generally speaking, CSI is information describing one or more characteristics of each of the OFDM channels (for example, the gain, the phase and the SNR of each channel).

Upon determining the CSI for one or more channels, the receiver may send this CSI back to the transmitter, which may use the CSI for each channel to precondition the signals transmitted using that channel so as to compensate for the varying propagation effects of each of the channels. Preconditioning typically includes combining multiple signals over multiple streams, and transmitting each of the multiple streams over a specific antenna. MIMO preconditioning typically includes to use of a beamsteering matrix such that transmitted signals do not interfere with one another when received at the receiver.

An important part of a wireless communication system is therefore the selection of the appropriate data rates, and the coding and modulation schemes to be used for a data transmission based on channel conditions. Generally speaking, it is desirable to use the selection process to maximize throughput while meeting certain quality metrics, such as those defined by a desired frame error rate (FER), latency criteria, etc.

In addition to the frequency channels created by the use of OFDM, a MIMO channel formed by the various transmit and receive antennas between a particular transmitter and a particular receiver includes a number of independent spatial channels. As is known, a wireless MIMO communication system can provide improved performance (e.g., increased transmission capacity) by utilizing the additional dimensionalities created by these spatial channels for the transmission of additional data. The spatial channels of a wideband MIMO system may experience different channel conditions (e.g., different fading and multi-path effects) across the overall system bandwidth and may therefore achieve different SNRs at different frequencies (i.e., at the different OFDM frequency sub-bands) of the overall system bandwidth. Consequently, the number of information bits per modulation symbol (i.e., the data rate) that may be transmitted using the different frequency sub-bands of each spatial channel for a particular level of performance may differ from frequency sub-band to frequency sub-band.

However, instead of using the different transmit and receive antennas to form separate spatial channels on which additional information is sent, better reception properties can be obtained in a MIMO system by using each of the various transmit antennas of the MIMO system to transmit the same signal while phasing (and amplifying) this signal as the signal is provided to the various transmission antennas to achieve beamforming or beamsteering. Generally speaking, beamforming or beamsteering creates a spatial gain pattern having one or more high gain lobes or beams (as compared to the gain obtained by an omni-directional antenna) in one or more particular directions, while reducing the gain over that obtained by an omni-directional antenna in other directions. If the gain pattern is configured to produce a high gain lobe in the direction of each of the receiver antennas, the MIMO system can obtain better reception reliability between a particular transmitter and a particular receiver, over that obtained by single transmitter-antenna/receiver-antenna systems.

There are many known techniques for determining a steering matrix specifying the beamsteering coefficients that need to be used to properly condition the signals being applied to the various transmission antennas so as to produce the desired transmit gain pattern at the transmitter. As is known, these coefficients may specify the gain and phasing of the signals to be provided to the transmission antennas to produce high gain lobes in particular or predetermined directions. An important part of determining the steering matrix is taking into account the specifics of the channel between the transmitter and the receiver, referred to herein as the forward channel. As a result, steering matrixes are typically determined based on the CSI of the forward channel.

Although beamsteering in MIMO systems offers several advantages over traditional single-antenna systems, MIMO systems have their drawbacks. First, because MIMO beamsteering requires multiple antennas at both the transmitter and the receiver, MIMO systems add cost and complexity to the devices in which they are implemented. Second, MIMO preconditioning involves the use of a beamsteering matrix to improve performance, which is incompatible with communication devices that utilize a single antenna system for transmission and/or reception. Third, because existing MIMO systems rely on spatial beamforming to improve communication performance, the performance increase provided by existing MIMO systems is somewhat limited by the number of MIMO antennas at the transmitter and/or receiver.

SUMMARY

Embodiments of methods, systems, and apparatus are described for controlling sub-carrier signal power distribution in wireless communication systems.

In one embodiment, a method includes calculating, by a first communication device, channel state information (CSI) corresponding to propagation of signals transmitted from the first communications device to a second communications device. The method also includes, based on the CSI, (i) determining, by the first communication device, a first signal attenuation level corresponding to signals transmitted over a first sub-carrier frequency signal from the first communications device to the second communications device, and (ii) determining, by the first communication device, a second signal attenuation level corresponding to signals transmitted over a second sub-carrier frequency signal from the first communications device to the second communications device. Additionally, the method includes transmitting, by the first communication device, data encoded over the first sub-carrier frequency and the second sub-carrier frequency to the second communication device by (i) increasing power loaded to signals transmitted over a sub-carrier frequency from among the first sub-carrier frequency and the second sub-carrier frequency that is associated with greater signal attenuation, and (ii) decreasing power loaded to signals transmitted over a sub-carrier frequency from among the first sub-carrier frequency and the second sub-carrier frequency that is associated with lesser signal attenuation.

In another embodiment, a first communication device comprises a CSI calculation and power compensation unit configured to calculate channel state information (CSI) corresponding to propagation of signals transmitted from the first communications device to a second communications device, determine a first signal attenuation level corresponding to signals transmitted over a first sub-carrier frequency from the first communications device to the second communications device based on the CSI, and determine a second signal attenuation level corresponding to signals transmitted over a second sub-carrier frequency from the first communications device to the second communications device based on the CSI. The first communication device also comprises a radio frequency (RF) front-end configured to transmit data via the first sub-carrier frequency and the second sub-carrier frequency to the second communication device when the first signal attenuation level is greater than the second signal attenuation level by (i) applying a beamsteering matrix to signals transmitted via the first sub-carrier frequency and the second sub-carrier frequency, (ii) increasing power loaded to signals transmitted over the first sub-carrier frequency, and (iii) decreasing power loaded to signals transmitted over the second sub-carrier frequency.

In yet another embodiment, a first communication device comprises a CSI calculation and power compensation unit configured to calculate channel state information (CSI) corresponding to propagation of signals transmitted from a second communication device to the first communication device, and determine a first signal attenuation level corresponding to signals received over a first sub-carrier frequency from the second communications based on the CSI, and determine a second signal attenuation level corresponding to signals received over a second sub-carrier frequency from the second communications device based on the CSI. The first communication device also comprises a radio frequency (RF) front end configured to condition the combined signal when the first signal attenuation level is greater than the second signal attenuation level by (i) combining data encoded over the first sub-carrier frequency and the second sub-carrier frequency to provide a combined signal, (ii) increasing power loaded to signals received over the first sub-carrier frequency, and (iii) decreasing power loaded to signals received over the second sub-carrier frequency.

DETAILED DESCRIPTION

Figure 1:
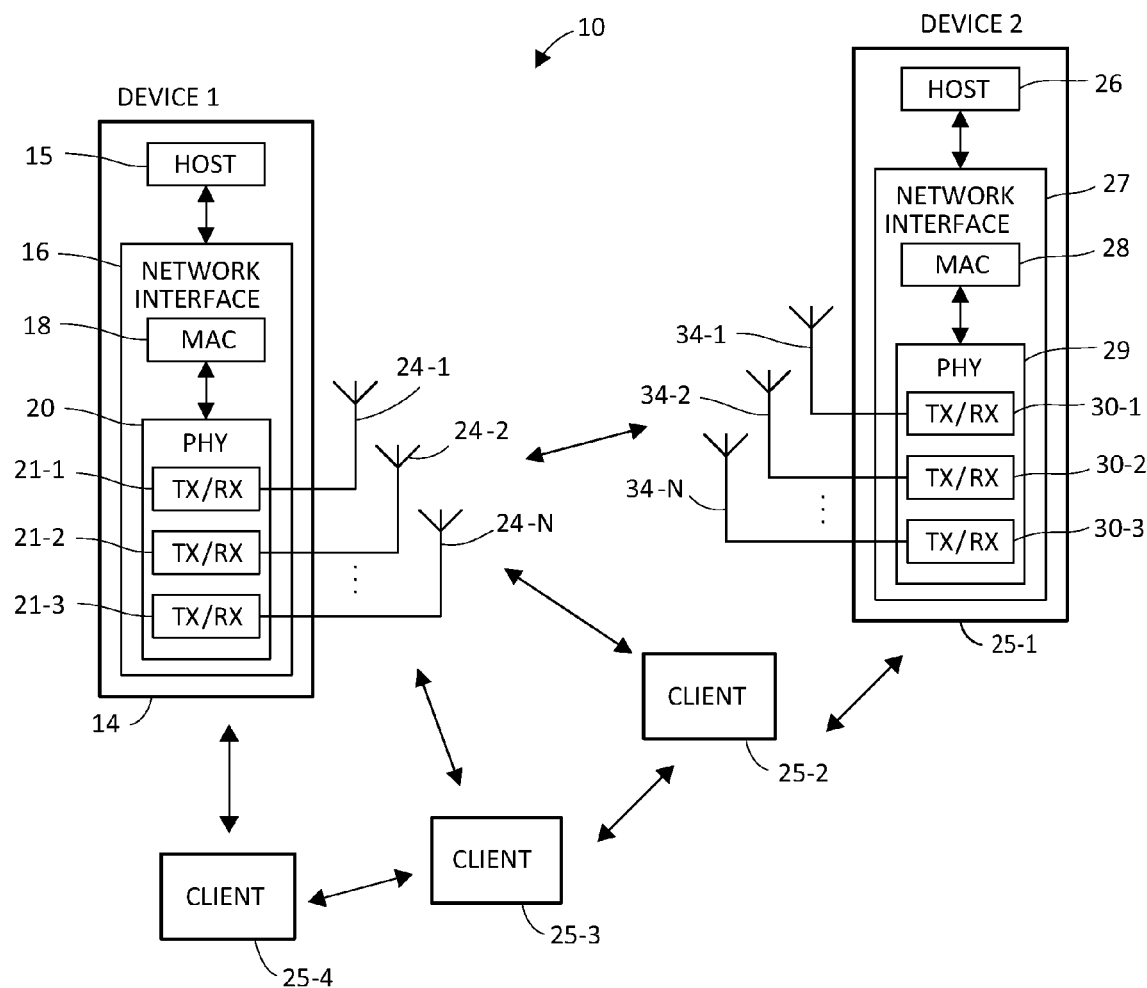
FIG. 1 is a block diagram of an example network 10 in which one or more communication devices utilize power adjustment techniques in accordance with various embodiments of the present disclosure.

FIG. 1 is a block diagram of an example network 10 in which one or more communication devices utilize power adjustment techniques in accordance with various embodiments of the present disclosure. A communication device 14 includes a host processor 15 coupled to a network interface 16. Network interface 16 includes a medium access control (MAC) processing unit 18 and a physical layer (PHY) processing unit 20. PHY processing unit 20 includes one or more transceivers 21, which are coupled to one or more antennas 24. As will be appreciated by those of skill in the art, although three transceivers 21 and three antennas 24 are illustrated in FIG. 1, various embodiments of AP 14 include any suitable number (e.g., 1, 2, 3, 4, 5, etc.) of transceivers 21 and antennas 24. Further in accordance with various embodiments, any suitable number of transceivers 21 are coupled to any suitable number of antennas 24, such that one or more antennas are shared between transceivers and/or vice versa.

Network 10 also includes a plurality of communication devices 25. Although four communication devices 25 are illustrated in FIG. 1, various embodiments of network 10 include any suitable number (e.g., 1, 2, 3, 4, 5, 6, etc.) of communication devices 25. A communication device 25-1 includes a host processor 26 coupled to a network interface 27. Network interface 27 includes a MAC processing unit 28 and a PHY processing unit 29. PHY processing unit 29 includes one or more transceivers 30, which are coupled to one or more antennas 34. Although three transceivers 30 and three antennas 34 are illustrated in FIG. 1, various embodiments of communication device 25-1 include any suitable number (e.g., 1, 2, 3, 4, 5, etc.) of transceivers 30 and antennas 34. Further in accordance with various embodiments, any suitable number of transceivers 30 are coupled to any suitable number of antennas 34, such that one or more antennas are shared between transceivers and/or vice versa.

In accordance with various embodiments of the present disclosure, any suitable number of communication devices 25-2, 25-3, and 25-4 has a structure the same as or substantially similar to communication device 25-1. In accordance with such embodiments, communication devices 25 structured the same as or substantially similar to communication device 25-1 include any suitable number of transceivers and antennas. For example, although communication device 25-1 is illustrated as having three transceivers 30 and three antennas 34, various embodiments of communication device 25-2 have a suitable number of transceivers different than three, and a suitable number of antennas different than three. The numbers of antennas and transceivers associated with communication devices 25-2, 25-3, and 25-4 is not shown in FIG. 1 for purposes of brevity.

Network 10 supports communications in accordance with any number of suitable communication protocols, such as mobile telephony protocols, wireless local area network (WLAN) communication protocols specified by one or more IEEE standards, wireless personal area communication network protocols (e.g., the BLUETOOTH® protocol), WiMAX, etc. Examples of suitable IEEE standards include 802.11a, 802.11, g, 802.11n, 802.11ac, 802.11ad, 802.11af, 802.11v, and/or 802.11ah standards (such standards are generally referred to herein as "IEEE 802.11x standards"). For example, various embodiments of communication device 14 and/or communication device 25 are configured to support WLAN and/or mobile telephony protocols such as 3rd Generation Partnership Project (3GPP) technologies including Long Term Evolution (LTE) protocols. Although FIG. 1 illustrates only a single communication device 14, various embodiments of communication devices 25 are configured to communicate with more than a single communication device at any time, including simultaneous communications with separate communication devices using communication protocols that may be the same or different from one another. In accordance with an embodiment of the present disclosure, communication device 14 and communication devices 25 are configured to transmit and receive data conforming to one or more communication protocols such as protocols conforming to one or more IEEE 802.11 standards or other suitable communication protocols. In accordance with another embodiment of the present disclosure, communication devices 25 are configured, additionally or alternatively, to transmit and receive data with one another conforming to one or more communication protocols such as protocols conforming to one or more IEEE 802.11 standards, or other suitable communication protocols, to support ad-hoc networking.

Again, in various embodiments, communication device 14 and/or one or more of communication devices 25 are configured with any suitable number of antennas. In embodiments in which communication device 14 and/or one or more of communication devices 25 are configured with more than one antenna, communication device 14 and/or one or more of communication devices 25 can be configured to use MIMO beamforming techniques for its respective communications.

In various embodiments, communication device 14 and/or communication devices 25 can be configured to determine channel state information (CSI) based on respective channel propagation paths. Channel state information and beamforming matrices can be calculated using variety of known methods, which include explicit and implicit beamforming techniques, as described in further detail below.

In accordance with explicit beamforming techniques, a communication device, denoted as a beamformer (e.g., communication device 14) first transmits a sounding packet to another communication device, denoted as a beamformee (e.g., communication device 25-1). Because the expected sounding packet has standardized signal properties known a priori to the beamformee, the beamformee can calculate the CSI in the forward channel (i.e., in the direction from the beamformer to the beamformee) and send this information back to the beamformer as feedback. Finally, using the feedback data, the beamformer can calculate the steering matrix and steer subsequent data sent to the beamformee using the calculated steering matrix. Protocols for explicit beamforming are described in, for example, the IEEE 802.11n and 802.11ac standards. In an embodiment, the beamformee can calculate a steering matrix based on the CSI for the forward channel, and send the calculated steering matrix back to the beamformer as feedback —the steering matrix can then be subsequently used by the beamformer to steer data to the beamformee.

Implicit beamforming techniques encompass two different types: standardized and non-standardized. In accordance with standardized implicit beamforming techniques, a beamformer sends a training request to a beamformee, which responds with a sounding packet. Once the beamformer receives the sounding packet, the beamformer can estimate the CSI for the reverse channel (i.e., in the direction from the beamformee to the beamformer) and transpose a calculated CSI matrix for the reverse channel to estimate CSI for the forward channel. Once the CSI for the forward channel is calculated, the beamformer can steer subsequent data sent to the beamformee using a beamsteering matrix calculated based on the CSI for the forward channel. The protocols for standardized implicit beamforming are described, for example, in the 802.11n standard.

In accordance with non-standardized implicit beamforming, the beamformer receives non-sounding packets transmitted from the beamformee, which could be standard data packets, for example. Upon receipt of the non-sounding packets, the beamformer estimates the CSI in the reverse channel, and transposes a calculated CSI matrix for the reverse channel to estimate CSI for the forward channel. Once the CSI is calculated for the forward channel, the beamformer can steer subsequent data sent to the beamformee using a beamsteering matrix calculated based on the CSI for the forward channel. The protocols and methods for non-standardized implicit beamforming are described in U.S. patent application Ser. No. 12/888,310, which issued as U.S. Pat. No. 8,644,368 on Feb. 4, 2014, and is incorporated herein by reference in its entirety.

In some embodiments, calibration and/or correction techniques, such as described in U.S. Pat. No. 7,978,781, are used in conjunction with standardized or non-standardized implicit beamforming. U.S. Pat. No. 7,978,781, which issued on Jul. 12, 2011, is incorporated herein by reference in its entirety.

In accordance with various embodiments, communication device 14 and/or one or more of communication devices 25 are configured to determine CSI using any suitable methods, such as those used in the explicit and implicit beamforming techniques previously discussed, for example. For example, communication device 14 could act as a beamformer while communicating with communication device 25-1, which is acting as a beamformee. Using this example, the forward channel would be in the direction of communication device 14 to communication device 25-1, while the reverse channel would be in the direction of communication device 25-1 to communication device 14. Further extending this example, various embodiments include communication device 14 utilizing any suitable method to calculate the CSI in the forward channel (also referred to herein as "forward channel CSI").

As is known, beamsteering matrices can be calculated in accordance with various methods using CSI. Although beamsteering requires signal transmission via more than one antenna, the methods to calculate CSI are used in accordance with one or more standard or non-standard protocols, regardless of the number of antennas implemented by a particular communication device. In other words, even if a communication device (e.g., communication device 14) has only one antenna, the forward channel CSI may still be calculated even if the forward channel CSI is not used in the calculation of a beamsteering matrix.

Because the CSI is readily obtained, embodiments of the present disclosure include communication device 14 and/or one or more of communication devices 25 using the calculated CSI to improve communications performance. In some embodiments, communication device 14 and/or one or more of communication devices 25 utilize the CSI when transmitting to another communication device via one or more antennas. In other embodiments, communication device 14 and/or one or more of communication devices 25 utilize the CSI to improve communications performance when receiving communications from another communication device via one or more antennas.

In an embodiment, the communications between communication device 14 and/or one or more of communication devices 25 conforms to a communication protocol that uses a plurality of communication channels, such as an orthogonal frequency division multiplexing (OFDM) protocol, for example. In accordance with such embodiments, communication device 14 and/or one or more of communication devices 25 improves communication performance by determining CSI, e.g., a forward channel CSI, and adjusting one or more of the signal metrics associated with signals that are transmitted to another communication device using the CSI, or by using the CSI, e.g., CSI in the reverse channel, to adjust one or more parameters associated with receiving communications from another communication device.

For example, in an embodiment, communication device 14 and/or communication device 25 is configured to communicate with one or more other communication devices using an OFDM communications protocol to determine a respective forward channel CSI. If communication device 14 has a single antenna, then communication device 14 does not need to calculate a beamforming matrix. However, communication device 14 can utilize the forward CSI to determine other signal properties, such as the attenuation of signals transmitted at one or more sub-carriers within each OFDM channel, for example. Using this example, communication device 14 can use the forward channel CSI to adjust the power loading for one or more channels. In this way, communication device 14 may increase the transmit power loading to signals carried on one or more sub-carriers having the greatest attenuation while decreasing the transmit power loading to signals carried on one or more sub-carriers having less attenuation.

In various embodiments, communication device 14 and/or one or more of communication devices 25 are configured to adjust power loading to signals transmitted or received over one or more communication channels using more than one antenna.

For example, in an embodiment, communication device 14 and/or one or more of communication devices 25 implements more than one antenna. In accordance with such embodiments, a transmitting communication device (e.g., communication device 14) is configured to utilize the forward CSI to increase the power loading to signals carried on those sub-carriers with the greatest attenuation while decreasing the power loading to signals carried on sub-carriers with less attenuation after signals have been conditioned in accordance with a particular beamforming pattern.

In another embodiment in which communication device 14 and/or one or more of communication devices 25 implements more than one antenna, a receiving communication device (e.g., communication device 25-1) is configured to utilize the forward CSI to increase the power loading to signals carried on sub-carriers with the greatest attenuation while decreasing the power loading to signals carried on sub-carriers with less attenuation after the receiver has combined one or more spatial streams received via the multiple receive antennas.

Figure 2:
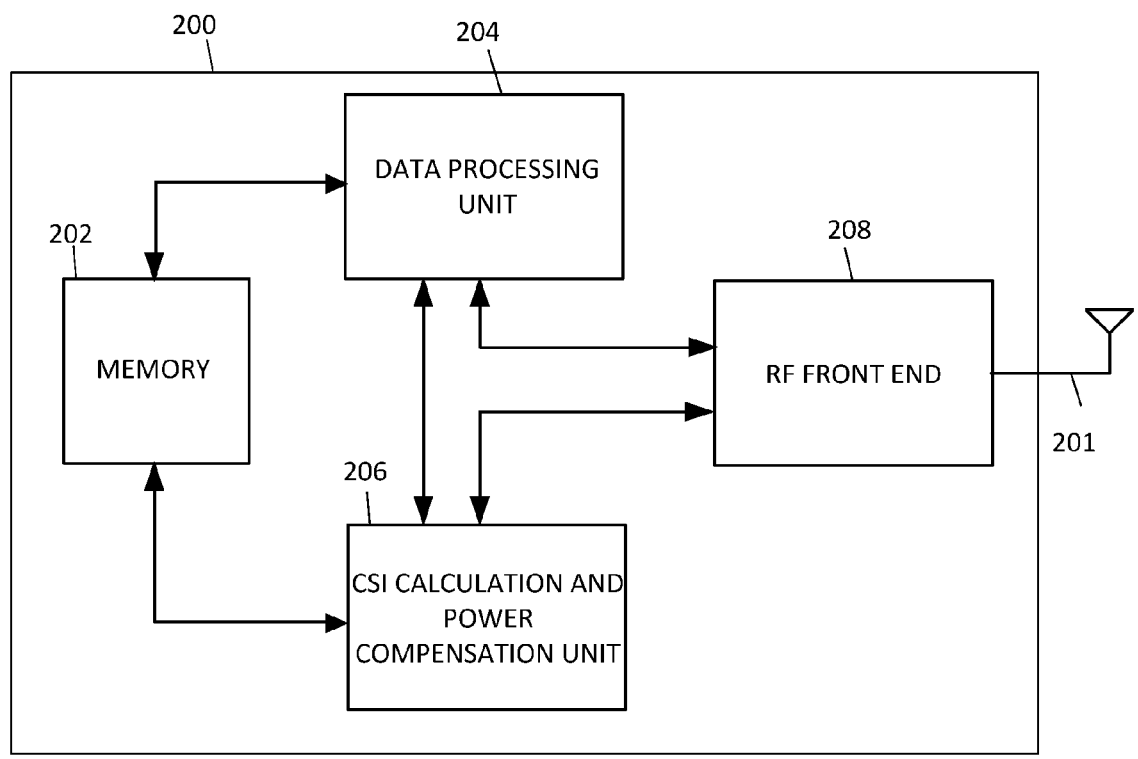
FIG. 2 is a block diagram of an example spectral power distribution system 200 in accordance with an embodiment of the present disclosure.

FIG. 2 is a block diagram of an example spectral power distribution system 200 in accordance with an embodiment of the present disclosure. Spectral power distribution system 200 includes an antenna 201, a memory device 202, a data processing unit 204, a CSI calculation and power compensation unit 206, and a radio frequency (RF) front end 208. In various embodiments, spectral power distribution system 200 is implemented as part of a communication device, such as communication device 14 or communication device 25-1, for example, as shown in FIG. 1.

Although antenna 201 is referred to and illustrated as a single antenna in FIG. 2, embodiments include antenna 201 implemented as any number of physical antennas that form an input to RF front end unit 208 but is incompatible with known MIMO beamforming techniques. For example, antenna 201 could include an antenna array providing a single input to RF front end unit 208 for transmitting and receiving signals. To provide another example, antenna 201 could represent two antennas, one of which is used for transmitting and the other which is used for receiving, but are not used for beamforming.

RF front end unit 208 is coupled to antenna 201 and is configured to transmit and/or receive signals via antenna 201. RF front end 208 can be implemented with any suitable number of amplifiers, oscillators, mixers, modulators, demodulators, couplers, filters, digital-to-analog converters (DACs), analog-to-digital converters (ADC), etc., to facilitate this functionality. RF front end unit 208 is configured to receive data to be transmitted from data processing unit 204, and to condition and transmit this data as one or more signals in accordance with one or more suitable communication protocols via antenna 201. RF front end unit 208 is configured to receive one or more signals in accordance with one or more suitable communication protocols via antenna 201, and to condition this data and send the conditioned data to data processing unit 204 and/or CSI calculation and power compensation unit 206.

Data processing unit 204 is configured to receive conditioned data from RF front end 208. Data processing unit 204 is configured to send data to RF front end unit 208 to be transmitted as part of one or more signals via antenna 201 in accordance with one or more suitable communication protocols. Data processing unit 204 may be implemented as any suitable type of controller such as as one or more standard multi-purpose, programmable processors, micro-processors, application specific integrated circuits (ASICs), or may be implemented using any other desired types of hardware, software and/or firmware. In an embodiment, data processing unit 204 is implemented as at least a part of host processor 15 or host processor 26, as part of communication device 14 and communication device 25, respectively, as shown in FIG. 1.

In various embodiments, data processing unit 204 is configured to send data utilized in the calculation of the CSI, such as sounding packets, training sequences, etc., to RF front end unit 208. Data processing unit 204 is configured to likewise receive data from RF front end unit 208 that is used to calculate the CSI, such as feedback beamformee data, sounding packets, etc.

Data processing unit 204 is configured to communicate with memory device 202 to store to and read data from memory device 202. In accordance with various embodiments, memory device 202 includes a volatile (e.g., a random access memory (RAM), or a non-volatile memory (e.g., battery backed RAM, FLASH, etc.). In various embodiments, data processing unit 204 is configured to store data received from RF front end unit 208 in memory device 202 as processed or unprocessed data. In various embodiments, data processing unit 204 is configured to read data from memory device 202 and to send this data to RF front end unit 208 to be transmitted as one or more signals via antenna 201.

CSI calculation and power compensation unit 206 is configured to communicate with RF front end unit 208 and/or data processing unit 204 and to calculate a CSI using this data. CSI calculation and power compensation unit 206 is configured to communicate with memory device 202 to store to and read data from memory device 202. In some embodiments, CSI calculation and compensation unit 206 is configured to send data to and receive data from RF front end 208 and/or data stored in memory device 202 to calculate a CSI, such as sounding packets, training sequences, etc. In some embodiments, CSI calculation and power compensation unit 206 is configured to receive data that has been processed by data processing unit 204 and uses this processed data and/or data stored in memory device 202 to calculate a CSI.

For example, as previously discussed with reference to FIG. 1, various methods can be used to calculate a CSI, such as those used in explicit and implicit beamforming techniques. In various embodiments, CSI calculation and power compensation unit 206 is configured to process data, which could include, for example, feedback received in response to a transmitted sounding packet, sounding packet data received in response to a transmitted training sequence, a non-sounding packet, etc.

In various embodiments, any suitable combination of data processing unit 204 and/or CSI calculation and power compensation unit 206 processes this data to calculate the CSI. For example, in an embodiment, data processing unit 204 processes data received via RF front end 208 and sends this processed data to CSI calculation and power compensation unit 206. Using this example, CSI calculation and power compensation unit 206 calculates the CSI using the processed data. Calculation of the CSI can be appropriately offloaded between data processing unit 204 and/or CSI calculation and power compensation unit 206 based on the desired performance requirements and/or architecture of a particular communication device in which spectral power distribution system 200 is implemented.

In various embodiments, once the CSI is calculated, CSI calculation and power compensation unit 206 and/or data processing unit 204 is configured to utilize the CSI to determine an appropriate adjusted sub-carrier power distribution. For example, if RF front end 208 is configured to transmit and receive communications in accordance with a communications protocol that uses multiple channels having multiple sub-carriers, then CSI calculation and power compensation unit 206 can determine the appropriate sub-carrier signal power loading for one or more of the channels. More specifically, because the CSI includes information regarding the effects of attenuation due to propagation loss, fading, interference, multipath distortion, etc., on signals transmitted via RF front end 208, CSI calculation and power compensation unit 206 can calculate power compensation information regarding those channels and/or sub-carrier frequencies that experience more attenuation compared to those channels and/or sub-carrier frequencies that experience less attenuation.

As will be appreciated by those of ordinary skill in the relevant art(s), various embodiments of RF front end 208 are configured to vary the power loaded to signals transmitted on each channel and/or sub-carrier using any suitable technique. For example, RF front end 208 could implement variable gain voltage and/or current amplifiers to control the signal power level for signals transmitted at each communication channel and/or sub-carrier frequency.

In various embodiments, CSI calculation and power compensation unit 206 calculates the power distribution for signals to be transmitted via one or more channels and/or sub-carriers frequencies in accordance with the appropriate communications protocol. The power compensation information may be represented as any suitable type of data that may be utilized by RF front end 208 to adjust the power level of signals transmitted over one or more communication channels and/or sub-carrier frequencies. For example, the power compensation data could include power loading coefficients, current and/or voltage driver values, amplifier gain values, etc.

Although the CSI information is typically utilized to condition signals for transmission over multiple antennas, the CSI can be utilized to determine the adjusted spectral power loading across one or more sub-carriers in a single transmit antenna case. As will be appreciated by those of ordinary skill in the relevant art(s), calibration matrixes are often calculated to compensate for differences between the forward and reverse channels in accordance with IEEE 802.11x standards. For example, in some embodiments, calibration and/or correction techniques described in U.S. Pat. No. 7,978,781 are utilized in conjunction with standardized or non-standardized implicit beamforming, as described above. Therefore, the beamforming pattern is a result of a combination of the calibration and steering matrixes to compensate for differences between the forward channel and the reverse channel. In the case of a single antenna, however, the CSI and calibration matrixes reduce to a scalar effect that is applied equally across all sub-carrier frequencies. As a result, even though the CSI may be utilized as part of a MIMO beamforming system, using the CSI to calculate the adjusted power distribution of one or more sub-carriers in a single antenna transmission system does not result in unequal sub-carrier power amplification across one or more communication channels.

In some embodiments, CSI calculation and power compensation unit 206 is configured to communicate, calculate, and/or measure the power levels of one or more signals transmitted from RF front end 208. In general, CSI calculation and power compensation unit 206 and/or RF front end 208 can be implemented with any suitable number of power meters, peak detectors, etc., to accomplish this functionality. Therefore, in accordance with such embodiments, CSI calculation and power compensation unit 206 can compare the power levels of signals transmitted by RF front end 208 to the power levels of signals received by another communication device, which is included in the CSI, to determine the attenuation of one or more signals.

In other embodiments, if the CSI includes the signal attenuation levels and/or if the signal attenuation levels can be obtained from the calculated CSI, then CSI calculation and power compensation unit 206 does not need to measure and/or calculate power levels of one or more signals transmitted from RF front end 208. As will be appreciated by those of ordinary skill in the relevant art(s), the type and detail of information included in the CSI may vary based on the type of CSI determination used (e.g., those used in explicit and implicit beamforming techniques). In various embodiments, any portion of the attenuation calculations may be shared between CSI calculation and power compensation unit 206 and the receiving communication device, depending on the beamforming technique and/or the communications protocol that is implemented.

In some embodiments, CSI calculation and power compensation unit 206 is configured to provide the power compensation data to RF front end unit 208 relevant to the architecture of RF front end 208. For example, in an embodiment, CSI calculation and power compensation unit 206 could communicate with RF front end 208 and/or be programmed with information regarding power control values implemented by RF front end 208. For example, power control values could include information regarding a correlation between one or more control metrics used by RF front end 208 and/or the expected change in signal power levels upon application of the control metrics by RF front end 208 to transmitted signals. Power control values could include, for example, gain values, gain functions, transfer functions, voltage and/or current bias levels, etc. In accordance with such embodiments, CSI calculation and power compensation unit 206 is configured to calculate the required adjustments in signal power levels for one or more communication channels and/or sub-carrier frequencies based on one or more of the control values.

To provide an illustrative example, assume that RF front end unit 208 implements a series of variable current amplifiers to control the power level of signals transmitted at respective sub-carrier frequency within each communication channel. The relationship between the bias current levels and gain might vary based on the different sub-carrier and/or communication channel frequencies. That is, one amplifier used for signal transmissions over one sub-carrier frequency could have a gain function of lmA/dBm, while another amplifier used for signal transmissions over another sub-carrier frequency could have a gain function of 1.3 mA/dBm. In such an example, CSI calculation and power compensation unit 206 could be programmed with or obtain this information from RF front end 208 to determine this gain function information.

In various embodiments, any portion of the determination of the adjustments in power signal levels is shared between CSI calculation and power compensation unit 206 and/or RF front end 208. For example, CSI calculation and power compensation unit 206 could calculate the desired adjustments in the transmitted signal power at one or more sub-carrier frequencies and send this information to RF front end 208. Using this information, RF front end 208 could apply the required power loading adjustments.

Typically the total power of signals transmitted via RF front end 208 is limited by communication protocols, safety standards, governmental regulations, etc. In other words, the aggregate power across all channels in accordance with a particular communications protocol may only be increased to a certain maximum power limit. Therefore, embodiments of the present disclosure include CSI calculation and power compensation unit 206 calculating adjustments for the signal power level at each communication sub-carrier frequency and/or channel to avoid the aggregate power across all communication channels from exceeding this maximum power limit.

For example, in an embodiment, CSI calculation and power compensation unit 206 can calculate one or more sub-carrier frequencies that are associated with higher signal attenuation levels and one or more sub-carrier frequencies that are associated with the lower signal attenuation levels. If one or more sub-carrier frequency signals having lower signal attenuation levels has a "surplus" of power, then CSI calculation and power compensation unit 206 can calculate an adjusted channel power distribution that reduces the power loading for lower signal attenuated sub-carrier frequency signals while increasing the power loading for higher attenuated sub-carrier frequency signals.

To provide an illustrative example, assume that CSI calculation and power compensation unit 206 determines that a first sub-carrier frequency signal is experiencing signal attenuation levels of −5 dBm and a second sub-carrier frequency signal is experiencing signal attenuation levels of −7 dBm. In this example, CSI calculation and power compensation unit 206 could calculate a new spectral power distribution by calculating a decreased power loading of 1 dBm for the first sub-carrier frequency signal and an increased power loading of the same amount (1 dBm) for the second sub-carrier frequency signal.

In an embodiment, CSI calculation and power compensation unit 206 is configured to determine one or more signal power thresholds and use these thresholds to calculate an adjusted signal power level for one or more communication channels and/or sub-carrier frequencies. For example, standard communication protocols are typically associated with a particular minimum receiver sensitivity based on the number of communication channels, modulation, coding rate, etc. In various embodiments, CSI calculation and power compensation unit 206 is configured to use this information in the process of calculating an adjusted per-channel and/or per-sub-carrier power distribution.

In various embodiments, CSI calculation and power compensation unit 206 is configured to identify an implemented communication protocol by communicating with RF front end 208 and/or data processing unit 204, by accessing information stored in memory device 202, from the CSI, etc. In this way, CSI calculation and power compensation unit 206 is configured to determine and correlate a plurality of communication protocols and their respective thresholds when implemented as part of a communication device that may utilize more than one communication protocol.

To provide an illustrative example, the IEEE 802.11ac standard includes minimum receiver sensitivities for various communication channels, coding rates, and modulations. For an 80 MHz channel, a coding rate of 2/3 with 64-quadrature amplitude modulation (64-QAM) corresponds to a receiver sensitivity of −60 dBm. If the CSI indicates that some sub-carriers transmitted by RF front end 208 in accordance with 80 MHz 64-QAM have fallen below this −60 dBm threshold, then CSI calculation and power compensation unit 206 can determine an adjusted power loading. This power loading can result in a decrease in the power of signals transmitted over sub-carriers that exceed this −60 dBm threshold and an increase in the power of signals transmitted over sub-carrriers that fall below the −60 dBm threshold.

In various embodiments, RF front end 208 can adjust the modulation rate and/or coding rate based on the adjusted spectral power information. Building upon the previous example, 80 MHz channel communications in accordance with the IEEE 802.11ac standard using 256-QAM and a coding rate of 5/6 typically requires receiver sensitivities around −53 dBm, while 80 MHz channel communications in accordance with the IEEE 802.11ac standard using 64-QAM and a coding rate of 3/4 typically requires receiver sensitivities around −58 dBm.

To provide an illustrative example, if CSI calculation and power compensation unit 206 determines, based on the CSI, that the majority of sub-carrier signals transmitted in communications utilizing an 80 MHz 64-QAM channel exceed the −53 dBm threshold, then CSI calculation and power compensation unit 206 can determine an adjusted sub-carrier power loading across the 80 MHz channel that decreases the power of signals transmitted over sub-carriers that exceed the −53 dBm threshold and increases the power of signals transmitted over sub-carriers that are below the −53 dBm threshold. If the power loading adjustment results in each of the sub-carriers in the 80 MHz channel meeting or exceeding the −53 dBm threshold, RF front end 208 can optionally adjust subsequent transmissions to comply with 80 MHz 256-QAM communications having an coding rate of 5/6 instead of 80 MHz 64-QAM. In this way, spectral power distribution system 200 dynamically adjusts sub-carrier power levels to allow for increased data rates and throughput by utilizing the CSI.

Although FIG. 2 illustrates antenna 201, memory device 202, data processing unit 204, CSI calculation and power compensation unit 206, and RF front end 208 as separate units, various embodiments include any functionality described with reference to these respective units being shared or combined with other units. Furthermore, various embodiments include any of these respective units being integrated as part of the same device. For example, CSI calculation and power compensation unit 206 and data processing unit 204 could be integrated within the same processor or group of processors. To provide another example, the entire spectral power distribution system 200 could be integrated as a single processor, group of processors, a system on a chip (SoC), etc.

Figure 3:
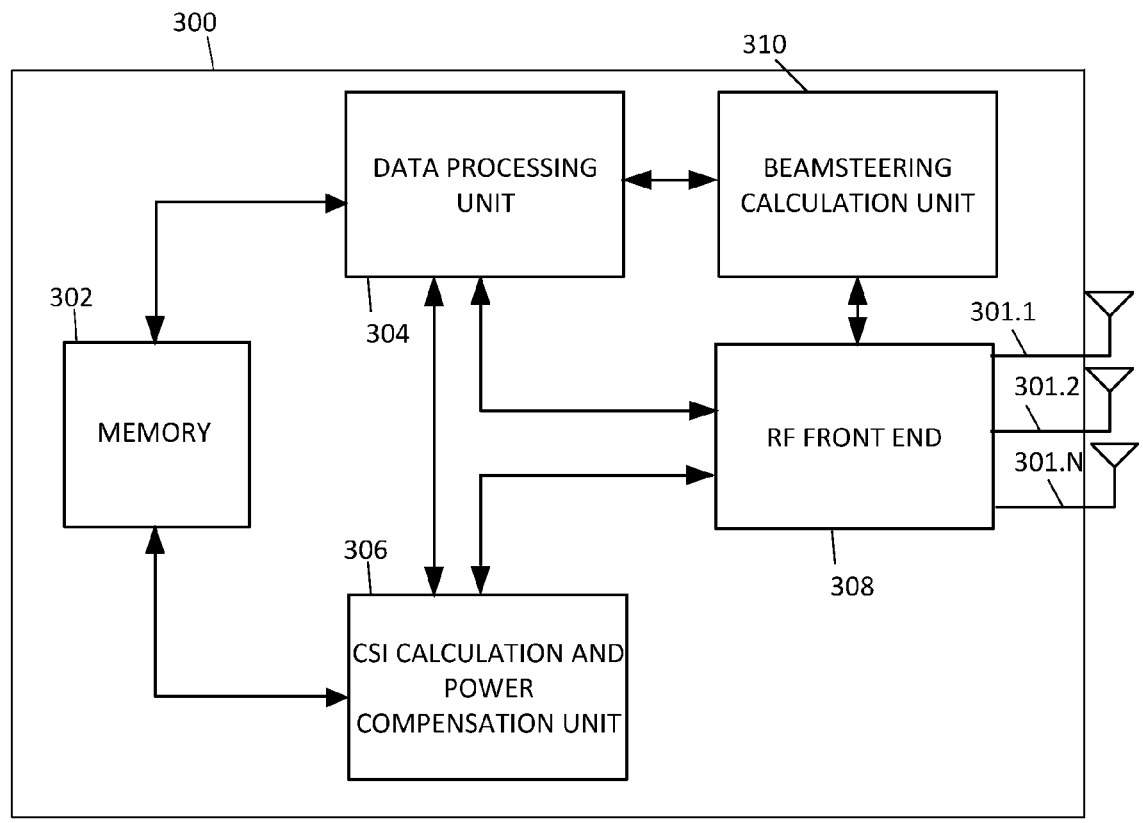
FIG. 3 is a block diagram of an example spectral power distribution system 300 in accordance with an embodiment of the present disclosure.

FIG. 3 is a block diagram of an example spectral power distribution system in accordance with an embodiment of the present disclosure. Spectral power distribution system 300 includes N number of antennas 301.1-301.N, a memory device 302, a data processing unit 304, a CSI calculation and power compensation unit 306, a radio frequency (RF) front end 308, and a beamsteering calculation unit 310. In various embodiments, spectral power distribution system 300 is implemented as part of a communication device, such as communication device 14 or communication device 25, as shown in FIG. 1.

Memory device 302, data processing unit 304, CSI calculation and power compensation unit 306, and radio frequency (RF) front end 308 perform substantially similar functions as memory device 202, data processing unit 204, CSI calculation and power compensation unit 206, and radio frequency (RF) front end 208, respectively, as shown in FIG. 2. Therefore, only differences between these elements will be further described.

RF front end unit 308 is coupled to antennas 301.1-301.N and is configured to transmit and/or receive signals via antennas 301.1-301.N. In some embodiments, RF front end 308 is configured to transmit one or more spatial streams via antennas 301.1-301.N in accordance with one or more suitable MIMO beamsteering techniques. In other embodiments, RF front end unit 308 is configured to receive and combine one or more spatial streams received via antennas 301.1-301.N using one or more suitable MIMO combining techniques.

In accordance with transmitter embodiments, RF front end 308 is configured to process data to be transmitted from data processing unit 304 by modulating the data as part of one or more signals and injecting delays and/or gains into the modulated signals based on a steering matrix provided by beamsteering calculation unit 310. In this way, RF front end 308 is configured to thereby perform beamsteering or beamforming via the transmission antennas 301.1-301.N.

In embodiments in which RF front end 308 uses beamforming techniques to transmit one of more signals via antennas 301.1-301.N, RF front end 308 is configured to adjust the power levels of signals transmitted over one or more sub-carriers after beamforming has been conducted. For example, as previously discussed with reference to the single antenna spectral power distribution system 200, as shown in FIG. 2, CSI calculation and power compensation unit 306 is configured to determine the CSI and determine an adjusted sub-carrier power distribution based on the CSI.

As is generally known, beamforming or beamsteering typically includes applying appropriate phases and gains to the various signals as sent through the multiple transmission antennas 301.1-301.N, in a manner which causes the signals sent from the different transmission antennas 301.1-301.N to constructively interact (add in phase) in certain predetermined directions and to deconstructively interact (cancel) in other directions. Thus, beamsteering typically produces a beam pattern having high gain regions (referred to as high gain lobes) in various predetermined directions and low gain regions (typically referred to as nulls) in other directions. The use of beamforming techniques in a MIMO system enables a signal to be sent with high gain (as compared to an omni-directional antenna) in certain directions, and to be sent with low gain (as compared to an omni-directional antenna) in other directions. Thus, in the spectral power distribution system 300, RF front end 308 may utilize beamforming to enhance signal directivity towards receiver antennas of one or more other communication devices, which improves the SNR of the transmissions and results in more reliable transmissions. In this case, the beamforming technique will generally form high gain lobes in the direction of propagation at which the highest gain is desired, and in particular in the directions of propagation from RF front end 308 to each respective receiver antenna implemented by a receiving communication device or to the receiving communication device in general.

To implement beamforming in RF front end 308, the beamsteering calculation unit 310 is configured to determine or calculate a set of matrix coefficients (referred to herein as a steering matrix) which are used by RF front end 308 to condition the signals being transmitted by antennas 301.1-301.N. As will be appreciated by those of ordinary skill in the relevant art(s), various embodiments of RF front end 308 implement any suitable number of space-time mapping blocks, beamforming networks, etc., to provide this functionality. Generally speaking, the steering matrix for any particular frequency channel transmitted by RF front end 308 (in the forward channel between the RF front end 308 and another receiving communication device) may be determined by the beamsteering calculation unit 310 based on the CSI determined for that forward channel. In this case, beamsteering calculation unit 310 may implement any suitable beam steering or matrix computation techniques to compute the steering matrix, such as transmit maximum-ratio combining (MRC), singular value decomposition (SVD) techniques, etc.

In accordance with various embodiments, RF front end 308 is configured to apply these power adjustments to the conditioned signals after the steering matrix has been applied and the beamforming pattern has been calculated. In an embodiment, RF front end unit 308 first applies the proper steering matrix calculated by beamsteering calculation unit 310 in accordance with any suitable method, which is independent of the adjusted sub-carrier power levels calculated by CSI calculation and power compensation unit 306. Then, RF front end 308 additionally compensates for the sub-carrier power levels using the power adjustment information provided by CSI calculation and power compensation unit 306.

For example, RF front end 308 could utilize any suitable number of beamforming networks to first apply appropriate phases and gains to the various signals to be transmitted via the multiple transmission antennas 301.1-301.N. Once the appropriate phases and gains are applied, RF front end 308 can additionally adjust the sub-carrier signal power distribution in accordance with the sub-carrier power distribution information calculated from the CSI.

In accordance with receiver embodiments, signals received via antennas 301.1-301.N may be processed by RF front end 308 to enhance the reception capabilities of the antennas 301.1-301.N. As will be appreciated by those of ordinary skill in the relevant art(s), the processing applied at RF front end unit 308 may be based on, for example, the CSI. Data processing unit 304 and/or RF front end 308 may combine, decode, and/or demodulate the received signals. In this process, these signals may be downconverted to base-band and the received data subsequently processed in accordance with one or more suitable communication protocols by data processing unit 304.

In various embodiments, RF front end 308 is configured to receive one or more signals via antennas 301.1-301.N using MIMO and non-MIMO techniques. For example, in non-MIMO embodiments, antennas 301.1-301.N could be arranged in a diversity antenna gain implementation, and not used to combine more than one spatial stream. In other embodiments, antennas 301.1-301.N could be configured to receive multiple spatial streams and RF front end 308 is configured to combine each of these spatial streams in accordance with MIMO receiver combining techniques. The various embodiments discussed below for utilizing the CSI to adjust certain parameters, e.g., the receive power loaded to signals received via one or more sub-carrier frequencies, applies to both MIMO and non-MIMO receiver embodiments.

As will be appreciated by those of ordinary skill in the relevant art(s), RF front end 308 may be implemented with any suitable number of combiners, couplers, processors, etc., to facilitate the combining of one or more spatial streams received via antennas 301.1-301.N. In accordance with an embodiment, RF front end 308 is configured to combine each individual spatial stream that is received on one or more antennas 301.1-301.N into a single combined signal. By combining respective spatial streams received from more than one antenna and combining the signals in this way, RF front end 308 provides an improved signal-to-noise ratio (SNR) versus the processing of a single stream received via one antenna. The SNR improvement is a result of the beamsteering performed by the beamformer, which transmits the spatial streams via a beamformed signal transmission directed towards antennas 301.1-301.N.

In an embodiment, CSI calculation and power compensation unit 306 is configured to calculate the CSI of the forward channel, i.e., in the direction towards antennas 301.1-301.N when receiving one or more signals from another communication device. Similar to CSI calculation and power compensation unit 206, CSI calculation and power compensation unit 306 may implement any suitable technique to calculate the CSI, such as those used in explicit and implicit beamforming techniques, for example. Using the calculated CSI, CSI calculation and power compensation unit 306 is configured to calculate an adjusted spectral power distribution that compensates for signal attenuation for one or more sub-carriers. For example, if the CSI indicates that signals transmitted via a first sub-carrier experience greater attenuation compared to signals transmitted via a second sub-carrier, then CSI calculation and power compensation unit 306 can increase the power loaded to those sub-carrier signals that experience greater attenuation. In an embodiment, this sub-carrier power level adjustment is performed after the spatial stream is combined into a single data stream.

As will be appreciated by those of ordinary skill in the relevant art(s), RF front end 308 is configured to load additional power to sub-carrier signals that experience more attenuation at any suitable point in the data recovery process. For example, RF front end unit 308 could increase the gain of an amplifier stage after the combined spatial stream has been appropriately filtered. To provide another example, RF front end 308 can increase (or decrease) the amplification to one or more sub-carrier signals prior to down-conversion to an intermediate frequency (IF) and subsequent conversion of the signal to the digital domain, thereby ensuring a better representation of the respective baseband signals are converted to digital data. Because embodiments of spectral power distribution system 300 selectively increase and decrease power to only specific sub-carrier signals as opposed to the entire communications channel, spectral power distribution system 300 provides reduced power consumption compared to receiver systems that amplify the sub-carrier signals equally over an entire communication channel. In addition, by using the CSI to further condition received signals, spectral power distribution system 300 increases communication performance by improving bit-error rates (BER), since there is a greater likelihood that data will be received and properly decoded without the need for re-transmissions.

In various embodiments, spectral power distribution system 300 may implement both transmitter and receiver embodiments separately or as a single, combined embodiment. For example, RF front end 308 may implement transmitter embodiments when transmitting one or more signals to another communication device, and implement receiver embodiments when receiving one or more signals from another communication device. In this way, spectral power distribution system 300 improves communication performance by combing spatial beamforming with sub-carrier power adjustments by utilizing the CSI.

While the beamforming and sub-carrier power adjustment calculations described herein as being implemented in hardware, these calculations alternatively or additionally be implemented in software stored in, for example, one of the memory devices 202, 302, as shown in FIGS. 2 and 3, respectively, and implemented on a processor associated with, for example, data processing units 204, 304, CSI calculation and power compensation units 206, 306, beam-steering calculation units 310, RF front ends 208, 308, and/or the host processors 15, 26 of the communication system 10 of FIG. 1, or implemented in firmware as desired.

If implemented in software, the routines may be stored in any computer readable memory such as in RAM, ROM, flash memory, a magnetic disk, a laser disk, or other non-transitory tangible storage medium. Likewise, this software may be delivered to a MIMO system device (such as a transmitter or a receiver) via any known or desired delivery method including, for example, over a communication channel such as a telephone line, the Internet, a wireless connection, etc., or via a transportable medium, such as a computer-readable disk, flash drive, etc.

Figure 4A:
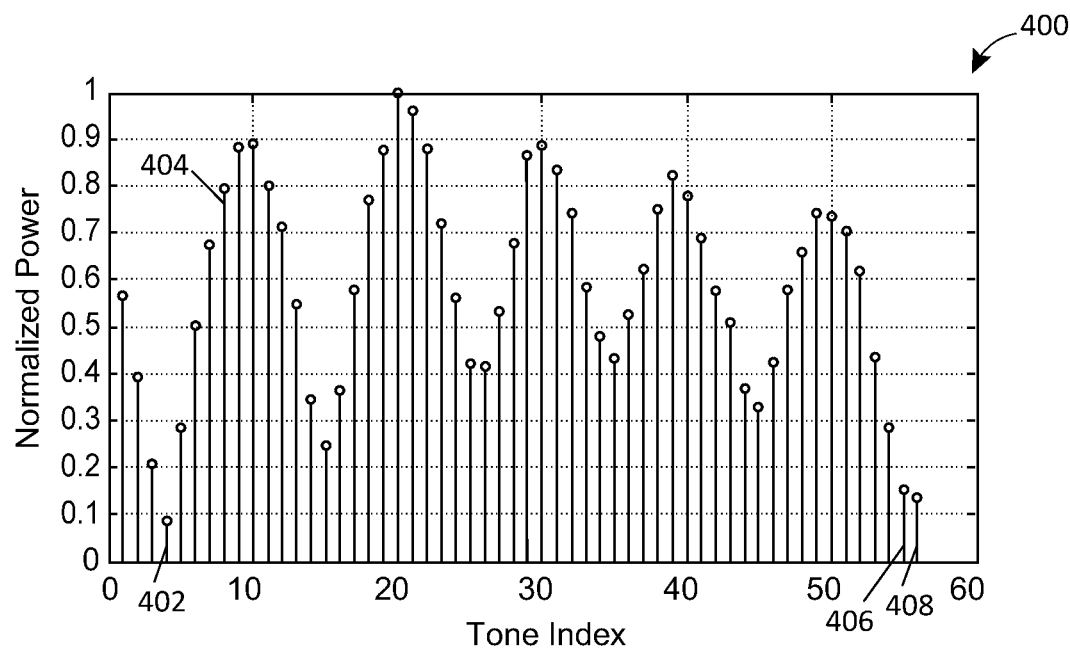
FIG. 4A illustrates an example spectral power distribution chart 400 before sub-carrier power compensation in accordance with an embodiment of the present disclosure.

FIG. 4A illustrates an example spectral power distribution chart 400 before sub-carrier power compensation in accordance with an embodiment of the present disclosure. Spectral power distribution chart 400 illustrates the power distribution across several sub-carriers that constitute a channel in accordance with a particular communication protocol transmitted and/or received via an RF front end, such as RF front end 208, 308, for example, as shown in FIGS. 2 and 3, respectively.

The channel illustrated in FIG. 4A could correspond to, for example, a 20 MHz channel, a 40 MHz channel, etc., such as those used in accordance with IEEE 802.11x standards. In an embodiment, the channel in FIG. 4A represents an OFDM communication channel. The vertical axis denotes normalized power while the horizontal axis denotes a tone index of each sub-carrier within the channel. FIG. 4A is for illustrative purposes and is not necessarily to scale. As a result, the illustrated number of sub-carriers may not reflect the actual number used in accordance with one or more standard communication protocols.

As illustrated in FIG. 4A, the signal associated with sub-carrier tone index 402 has a power level of approximately 0.1 compared to the normalized value. Furthermore, the signal associated with sub-carrier tone index 404 has a power level of approximately 0.8 compared to the normalized value. Assume that it is desirable to transmit each tone at or above a normalized power level, such as 0.2, for example. This could be, for example, a threshold receiver sensitivity that corresponds to an intended receiver of signals transmitted via the sub-carriers. Using this example, FIG. 4A illustrates several sub-carrier tone indexes that fall below this threshold value, such as sub-carrier tone indexes 402, 406, and 408, for example. In addition, FIG. 4A shows the sub-carrier tone indexes other than tone indexes 402, 406, and 408 are above this normalized threshold value of 0.2.

Figure 4B:
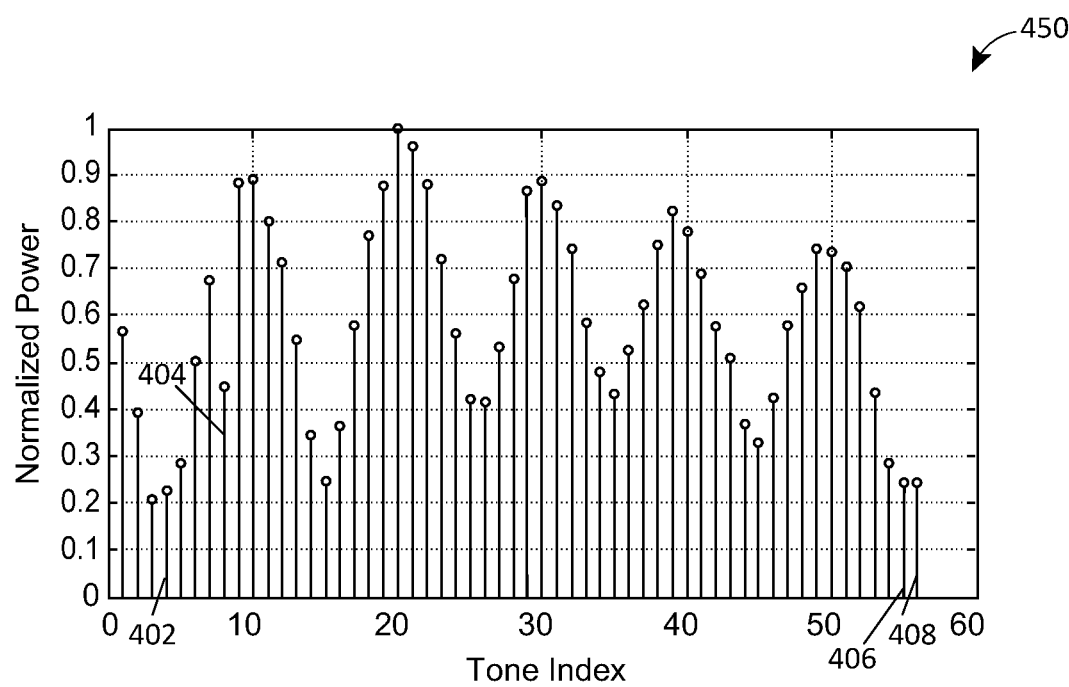
FIG. 4B illustrates an example spectral power distribution chart 450 illustrating a sub-carrier power distribution after power compensation in accordance with an embodiment of the present disclosure.

FIG. 4B illustrates an example spectral power distribution chart 450 illustrating a sub-carrier power distribution after power compensation in accordance with an embodiment of the present disclosure. Although FIGS. 4A and 4B describe power compensation being performed in response to threshold receiver sensitivity levels, various embodiments include using any suitable threshold value as a basis of spectral power distribution adjustments. FIG. 4B represents the spectral power distribution after adjustments have been made to increase the power levels associated with sub-carrier tone indexes 402, 406, and 408, while decreasing the power levels associated with sub-carrier tone index 404. In an embodiment in which the threshold normalized power value of 0.2 corresponds to a receiver sensitivity specification, the adjustments shown in FIG. 4B result in each sub-carrier tone index being above this threshold and thus meeting the sensitivity requirements across the entire communications channel.

Again, the power distributions shown in FIGS. 4A-4B are not necessarily to scale. As a result, the amount of power in which sub-carrier index 404 is reduced may not appear to be the same as the amount in which the power is increased in each of sub-carriers 402, 406, and 408. In some embodiments, the amount of power in which a sub-carrier tone is reduced is applied equally among the other sub-tone indexes to increase their respective loaded power by the same amount. In other embodiments, the amount of power reduction in one or more sub-carrier tone indexes is distributed unequally such that more power is distributed to lower power sub-carrier indexes than higher power sub-carrier indexes.

Using the previous example, if the power loaded to sub-carrier tone index 404 was reduced from 0.80 to 0.45, embodiments could include redistributing this 0.35 reduction in normalized power equally or unequally among sub-carrier tone indexes 402, 406, and 408. For example, one third of the 0.35 power reduction could be added to each of the sub-carrier indexes 402, 406, and 408 in equal distribution embodiments. To provide another example, half of the 0.35 power reduction could be added to sub-carrier tone index 402, while the remaining half could be applied equally to sub-carrier tone indexes 406 and 408, in unequal distribution embodiments. As will be appreciated by those of ordinary skill in the relevant art(s), various embodiments of the present disclosure allow for the implementation of any suitable algorithm, function, etc., for sub-carrier tone index power compensation and redistribution.

Figure 5:
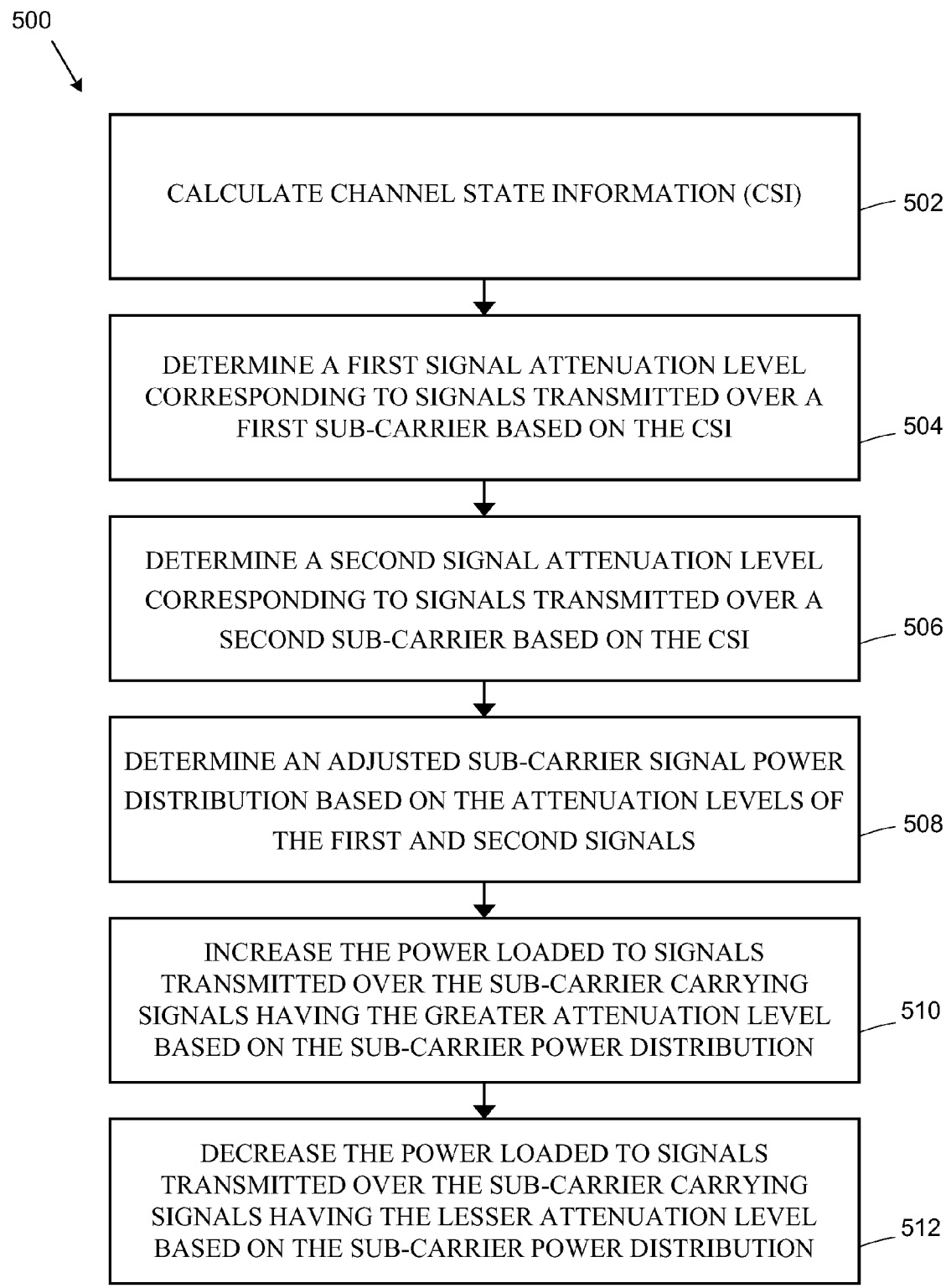
FIG. 5 is a flow diagram of an example method 500 in accordance with an embodiment of the present disclosure.

FIG. 5 is a flow diagram of an example method 500 in accordance with an embodiment of the present disclosure. In an embodiment, method 500 is implemented by a communication device, such as communication device 14 or communication device 25, for example, as shown in FIG. 1.

At block 502, a first communication device calculates channel state information (CSI) from communications exchanged between the first communication device and a second communication device. The first communication device could include, for example, communication device 14, as shown in FIG. 1, in an embodiment. The second communication device could include, for example, communication device 25-1, as shown in FIG. 1, in an embodiment. The CSI could be calculated, for example, using any suitable known methods, such as those used in explicit or implicit beamforming techniques, in an embodiment.

At blocks 504 and 506, the first communication device determines a first and second signal attenuation level corresponding to signals transmitted over a first and second sub-carrier, respectively, based on the CSI. This could include, for example, CSI calculation and power compensation unit 206 or 306, as shown in FIGS. 2 and 3, respectively, determining these attenuation levels using the calculated CSI.

At block 508, the first communication device determines an adjusted sub-carrier signal power distribution based on the attenuation levels of the first and second signals. This could include, for example, CSI calculation and power compensation unit 206 or 306, as shown in FIGS. 2 and 3, respectively, determining which sub-carrier signals require increased transmit power and which sub-carrier signals can have their transmit powers reduced based on the attenuation levels of each respective sub-carrier signal. In some embodiments, block 508 could include, for example, CSI calculation and power compensation unit 206 or 306, as shown in FIGS. 2 and 3, respectively, determining whether one or more sub-carrier signals is above or below a predetermined threshold value using the CSI, and determining an adjusted sub-carrier signal power distribution based on which sub-carriers meet, exceed, or fall short of this threshold.

At blocks 510 and 512, the first communication device increases the power loaded to transmitted sub-carrier signals having the greater attenuation level while decreasing the power loaded to transmitted sub-carrier signals having the lesser attenuation level based on the determined sub-carrier power distribution from block 508. This could include, for example, RF front end 208 or RF front end 308, as shown in FIGS. 2 and 3, respectively, adjusting the gain to one or more respective sub-carrier signal amplifiers based on the sub-carrier power distribution that was determined by CSI calculation and power compensation unit 206 or 306, as shown in FIGS. 2 and 3, respectively.

Although the Figures and accompanying descriptions used throughout this application generally use examples of IEEE 802.x standards, particularly OFDM compatible standards, various embodiments include these and other suitable communication protocols. For example, various embodiments of the present disclosure encompass any suitable communication protocol in which data is encoded, transmitted, and/or received across multiple tones, channels, and/or sub-carrier frequencies that have a non-uniform and/or adjustable power distribution.

The various blocks, operations, and techniques described above may be implemented in hardware, firmware, software, or any combination of hardware, firmware, and/or software. When implemented in hardware, some or all of the blocks, operations, techniques, etc. may be implemented in, for example, a custom integrated circuit (IC), an application specific integrated circuit (ASIC), a field programmable logic array (FPGA), a programmable logic array (PLA), etc.

When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium).

The present invention may be embodied in any suitable type of wireless communication system including, for example, ones used in wireless computer systems such as those implemented via a local area network or a wide area network, internet, cable and satellite based communication systems (such as internet, data, video and voice communication systems), wireless telephone systems (including cellular phone systems, voice over internet protocol (VoIP) systems, home-based wireless telephone systems, etc.)

While the beamforming techniques described herein for processing and effecting a wireless data transmission are described as being used in communication systems that use one of the IEEE 802.11x communication standards, these techniques may be used in various other types of wireless communication systems and are not limited to those conforming to one or more of the IEEE 802.11x standards.

Moreover, while the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A method in a first communication device, comprising:
   calculating, by the first communication device, channel state information (CSI) corresponding to propagation of signals transmitted from the first communication device to a second communication device via an orthogonal frequency division multiplexing (OFDM) channel;
   based on the CSI,
   (i) determining, by the first communication device, a first signal attenuation level corresponding to a first sub-carrier of the OFDM channel at a first frequency, and
   (ii) determining, by the first communication device, a second signal attenuation level corresponding to a second sub-carrier of the OFDM channel at a second frequency;
   applying, at the first communication device, a beamsteering matrix to signals that are to be transmitted to the second communication device via the OFDM channel;

determining, by the first communication device and using the first signal attenuation level, that i) signals transmitted over the first sub-carrier are below a desired power level, and ii) power loaded to the signals transmitted over the first sub-carrier is to be increased;

determining, by the first communication device and using the second signal attenuation level, that i) signals transmitted over the second sub-carrier are above the desired power level, and ii) power loaded to the signals transmitted over the second sub-carrier is to be decreased; and transmitting, by the first communication device, data encoded over subcarriers in the OFDM channel, including
- (i) after applying the beamsteering matrix, increasing power loaded to signals transmitted over a sub carrier, from among the first sub-carrier, and
- (ii) after applying the beamsteering matrix, decreasing power loaded to signals transmitted over the second sub-carrier.

2. The method of claim 1, wherein determining that signals transmitted over the second sub-carrier are above the desired power level comprises:
determining that the second signal attenuation level is below a threshold attenuation level.

3. The method of claim 1, wherein determining that signals transmitted over the first sub-carrier are below the desired power level comprises:
determining that the first signal attenuation level is above a threshold attenuation level.

4. A first communication device, comprising:
one or more integrated circuits;
a CSI calculation and power compensation unit implemented on the one or more integrated circuits, the CSI calculation and power compensation unit configured to
- calculate channel state information (CSI) corresponding to propagation of signals transmitted from the first communication device to a second communication device via an orthogonal frequency division multiplexing (OFDM) channel,
- determine a first signal attenuation level corresponding to signals transmitted over a first sub-carrier of the OFDM channel at a first frequency based on the CSI,
- determine a second signal attenuation level corresponding to signals transmitted over a second sub-carrier of the OFDM channel at a second frequency based on the CSI,
- determine, using the first signal attenuation level, that i) signals transmitted over the first sub-carrier are below a desired power level, and ii) power loaded to the signals transmitted over the first sub-carrier is to be increased, and
- determine, using the second signal attenuation level, that i) signals transmitted over the second sub-carrier are above the desired power level, and ii) power loaded to the signals transmitted over the second sub-carrier is to be decreased; and a radio frequency (RF) front-end implemented on the one or more integrated circuits, the RF front-end configured to
- transmit data via the OFDM channel to the second communication device by
  - (i) applying a beamsteering matrix to signals that are to be transmitted via the OFDM channel,
  - (ii) increasing power loaded to signals that are to be transmitted over the first sub-carrier after applying the beamsteering matrix, and
  - (iii) decreasing power loaded to signals that are to be transmitted over the second sub-carrier after applying the beamsteering matrix.

5. The first communication device of claim 4, wherein the CSI calculation and power compensation unit is further configured to determine that signals transmitted over the second sub-carrier are above the desired power level by determining that the second signal attenuation level is below a threshold attenuation level.

6. The first communication device of claim 4, wherein the CSI calculation and power compensation unit is further configured to determine that signals transmitted over the first sub-carrier are below the desired power level by determining that the first signal attenuation level is above a threshold attenuation level.

7. A first communication device, comprising:
one or more integrated circuits;
a CSI calculation and power compensation unit implemented on the one or more integrated circuits, the CSI calculation and power compensation unit configured to
- calculate channel state information (CSI) corresponding to propagation of signals transmitted from a second communication device to the first communication device via an orthogonal frequency division multiplexing (OFDM) channel,
- determine a first signal attenuation level corresponding to signals received over a first sub-carrier of the OFDM channel at a first frequency from the second communication device based on the CSI, and
- determine a second signal attenuation level corresponding to signals received over a second sub-carrier of the OFDM channel at a second frequency from the second communication device based on the CSI,
- determine, using the first signal attenuation level, that i) signals received over the first sub-carrier are below a desired power level, and ii) power loaded to the signals received over the first sub-carrier is to be increased, and
- determine, using the second signal attenuation level, that i) signals received over the second sub-carrier are above the desired power level, and ii) power loaded to the signals received over the second sub-carrier is to be decreased; and a radio frequency (RF) front end implemented on the one or more integrated circuits, the RF front end configured to
- combine multiple signals received via multiple antennas to generate a combined signal, and
- after combining the multiple signals, condition the combined signal when the first signal attenuation level is greater than the second signal attenuation level by
  - (i) increasing power loaded to signals received over the first sub-carrier, and
  - (ii) decreasing power loaded to signals received over the second sub-carrier.

8. The first communication device of claim 7, wherein the RF front end is further configured to decrease power loaded to signals received over the second sub-carrier when the second signal attenuation level is below a threshold attenuation level.

9. The first communication device of claim 7, wherein the RF front end is further configured to increase power loaded to signals received over the first sub-carrier when the first signal attenuation level is above a threshold attenuation level.

* * * * *